3,107,622
COMBINED HYDRAULIC AND PNEUMATIC PUMP
AND MOTOR UNIT FOR SIMULTANEOUS AIR,
VACUUM AND FLUID CIRCULATION
Adolph F. Graf von Soden, 3909 Riviera Drive,
Pacific Beach 9, Calif.
Filed Nov. 14, 1960, Ser. No. 69,234
10 Claims. (Cl. 103—4)

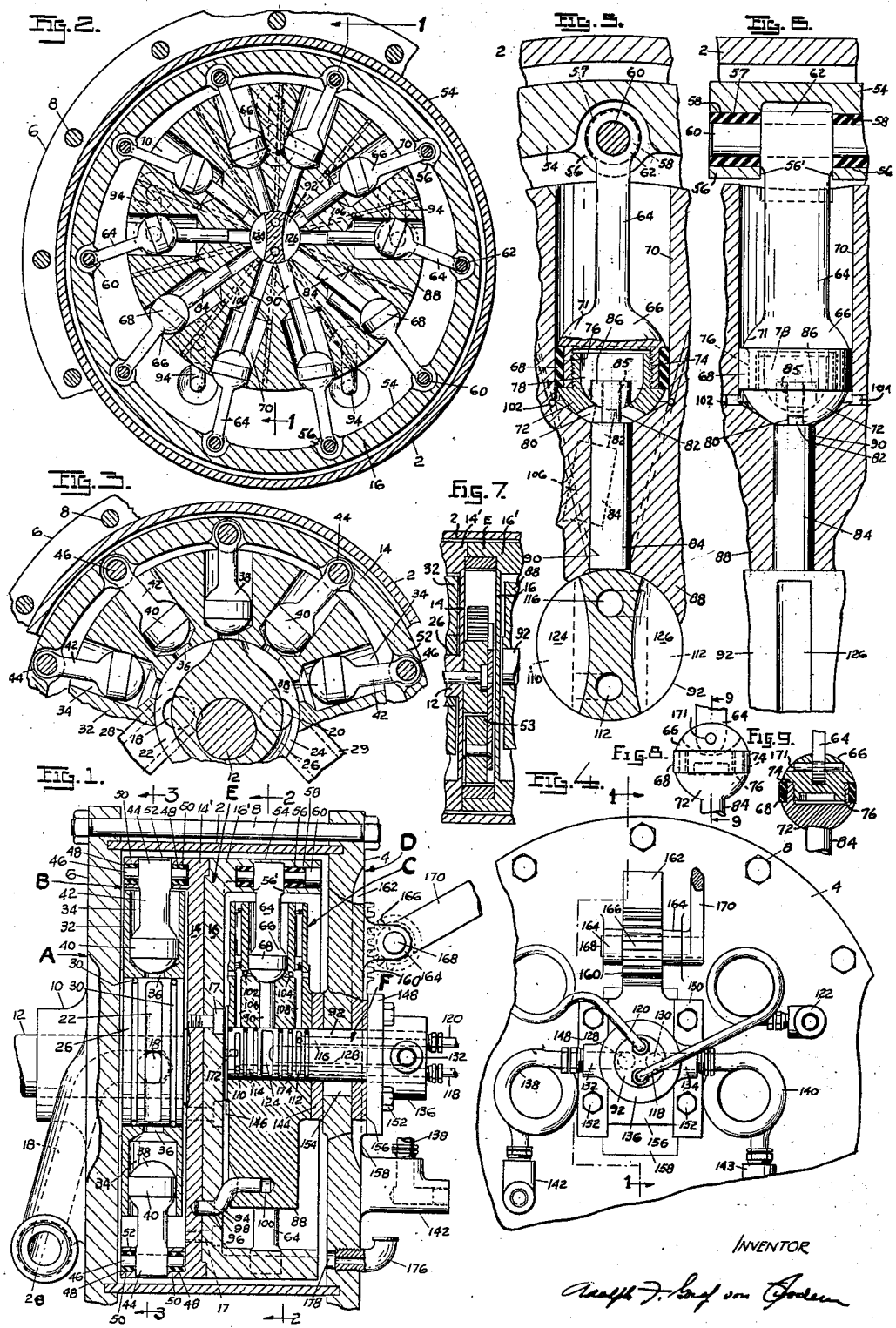

The invention relates to a combined hydraulic pump and motor unit, and more particularly to a rotary apparatus adapted for providing a driven pump as a primary unit, or, a driving pump as a primary unit for providing motive power in a secondary unit or pump for pumping a vacuum, securing air pressures and also having a fluid circulating sub-member unit associated therewith for pumping fluids simultaneously and when the apparatus is in operation.

Manifestly, an object of the invention is to provide a housing means adapted for enclosing therein a pair of rotary units, wherein one of said units comprising a driven rotary pump or a rotary driving motor, which is adapted to operate a second pumping unit for securing a vacuum, delivery of air pressure including a fluid circulation, or, for securing circulation of any combination of fluidic elements such as a liquid or a gas, and at a variable volumetric capacity, pressure or velocity.

Therefore, an object of the invention is to provide said apparatus with combination of a pair of rotary units each operating independently of the other and at the same time operating in unison, wherein one of said units being either a pump or a motor, while the second unit being a driven pumping unit for securing the circulation of fluidic elements, said second unit having means for variably controlling the volume and capacity of the fluidic mass passing therethrough.

Another object of the invention is to provide said apparatus with means having a rotary driving pump or a driven pump or motor for forming a first unit, also having a combination of a pump or motor for forming a second unit, each unit being provided with a plurality of specially constructed spheroidal pistons, each piston having a piston rod provided with a pivotal pin, and also, each pivotal pin having means for securing the highest efficiency in performance and with a minimum of frictional resistance.

A further object of the invention is to provide said pair of rotary units with a planetary gearing means adapted for rotating one unit in one direction and the other unit in an opposite direction simultaneously and at different speed of rotation of one unit to the other.

A further object of the invention is to provide said spheroidal piston means with a specially constructed plunger means, for securing a constant and a positive piston and plunger action and performance during the operation of the apparatus.

Another object of the invention is to provide said combination of pump and motor units with a suitable revolution compensating and stabilizing means, adapted for preventing a counter revolution or motion of the cylinder member units with respect to the rotation or revolution of the combined balancing member, when the apparatus is in use and operation.

The invention also has for its objects to provide such means that are positive in operation, convenient in use, easily installed in a working position and easily disconnected therefrom, economical in manufacture, relatively simple, and of general superiority and serviceability.

The invention also comprises novel details of construction and novel combinations and arrangements of parts, which will more fully appear in the course of the following description.

Reference is had to the accompanying drawings in which the similar reference characters denote the same parts.

In the drawing:

FIG. 1 is a vertically sectional view of the combined pump and motor apparatus, taken in the direction of the arrows 1—1 of FIG. 4.

FIG. 2 shows a vertically sectional view of the apparatus taken on lines 2—2 of FIG. 1.

FIG. 3 shows a fragmentary sectional view of the apparatus taken on lines 3—3 of FIG. 1.

FIG. 4 shows a fragmentary elevational view of the front section of said apparatus, taken from the right of FIG. 1 and showing the piston and plunger stroke adjusting means.

FIG. 5 shows an enlarged fragmentary sectional view of the combination piston and plunger means, as used in said apparatus and shown in the same sectional direction as illustrated in FIG. 2.

FIG. 6 shows another enlarged fragmentary sectional view of the combined piston and plunger means, shown in the same sectional direction as illustrated in FIG. 1.

FIG. 7 shows a vertically sectional view of the planetary gearing disposed in the center and between the web plates of a balancing member of the pair of rotating pumping and motor units, shown as a modified form of the apparatus.

FIG. 8 shows a fragmentary side view of the combined piston and plunger member in modified form.

FIG. 9 shows a fragmentary sectional view of the combined piston and plunger member, taken on line 9 of FIG. 8.

Describing the invention more in detail, in its broader aspects, said invention comprises a combined pump and motor rotary unit, consisting of a rear unit —A—, having the piston and cylinder block unit —B—, also having a front unit —D—, consisting of piston and plunger combination mounted in a combined cylinder block unit —C—, said cylinder block units —B— and —C— having a combined balancing member —E—, while said combined cylinder block unit —C— is rotatably mounted on an adjustably movable center bar —F—.

Said rear unit —A— and said front unit —D—, including said balancing member —E—, are enclosed by means of a shell member or housing 2 having open ends enclosed by a front cover 4 and a rear cover 6, which are held in place by means of suitable thru bolts 8.

A hub member 10 is provided in said rear cover 6 wherein a shaft 12 is rotatably mounted, the internally positioned end of said shaft is connected to and made a part of a rear web plate 14 which is provided with a rim 14' and thus forming a rear section of said balancing member E, and which is housed in said housing 2, said rim 14' extends rearwardly and is disposed in close proximity to said rear cover 6, as shown in FIG. 1.

The rear web plate 14 of said rear section of said balancing member E is faced in a suitable manner for providing a mounting surface for an adjacently positioned web plate 16 and which is also provided with a rim 16' for forming a front section of said balancing member E, said both web plates 14 and 16 are mounted face to face in their respective positions and held together by means of a plurality of suitable fastening members 17, as shown.

Said rear cover 6 is provided with the fluid inlet and outlet passages 18 and 20 respectively, see FIG. 3, each passage connecting the respective inlet and outlet grooves 22 and 24 which are disposed in a bearing boss member 26, and also, said inlet and outlet passages extend outwardly from said rear cover 6 the lowermost ends of said passages terminate with suitable pipe connections 28 and 29 (see FIG. 3), and to which the respective inlet and outlet pipes may be connected. (One shown in FIG. 1.)

Obviously, it may be noted that the apparatus may operate in a forward or reverse direction, therefore, either one of said inlet and outlet passages 18 or 20 and the pipe connections 28 or 29 respectively, may be used as the fluid outlet or inlet passages to which suitable pipe extensions may be connected as required.

Said bearing boss 26 is an integral part of said rear cover 6 and disposed at the inner surface side thereof in an off-center position with respect to the centrally mounted shaft 12, said off-center bearing boss 26 having suitable thickness for extending into said housing, the end of which terminates in close proximity to said rear web plate 14, also, said off-center bearing boss member 26 is provided with a pair of sealing rings 30, each ring being disposed at the opposite sides and in a close proximity to said inlet and outlet grooves 22 and 24, for preventing the fluid leakage when the apparatus is in use and operation.

The cylinder block unit —B— comprises a cylinder chamber unit 32 which is revolvably mounted upon said off-center bearing boss member 26 and is provided with a plurality of cylinder chambers 34, each chamber being radially positioned therein, see FIG. 3, and each having a suitable fluid passage 36 disposed at the bottom of each cylinder chamber for directing the fluid from each chamber into and out of said grooves 22 and 24 and then into and out of said inlet and outlet passages 18 and 20.

Each cylinder chamber 34 is provided with a spherically shaped piston member 38, each piston member having a resilient piston ring 40 which is wide in structure and fitting closely within the ring groove thereof and also having a close fit within the respective cylinder chamber, each piston member 38 is provided with a suitable piston rod or extension 42 which terminates with a pivoting boss member 44 and wherein the pivot pin 46 is mounted and secured, the ends of which extend sidewardly from each pivoting boss, as shown in FIGS. 1 and 6.

Each of said sidewardly extending ends of said pivot pin 46 is provided with a suitable pivot bushing 48, said bushing being made in preferred form out of a suitable resilient material or compounds, and each bushing is mounted within the respective and oppositely positioned sockets 50, said sockets being disposed in an equidistant position at a suitable radius and terminating within the rim base section 52 of said balancing member rim 14'.

It may be noted, that when the fluid under pressure is allowed to flow into said inlet passage 18, and since said cylinder chamber unit 32 is in its off-center position with respect to the center position of said rear balancing member 14', said pressure will cause said piston members 38 mounted in the respective cylinder chambers 34 and adjacent to said groove 22 to be forced upwardly and thereby causing said rear cylinder chamber unit 32 to revolve in a counter clockwise direction.

Also, since said bearing boss member 26 is in an off-center position, each piston member extension 42 will impart an outward pressure, thus forcing the rim 14' of said rear web plate 14 into a revolving motion, and thereby causing said combined balancing member —E— including said front rim 16' of said front web plate 16 to rotate together with said shaft 12.

It may also be noted, that said front rim 16' secured to said companion rear rim 14', may, if so desired, be mounted separately, for operating freely and independently from the other, and that the ratio of speed therebetween may be controlled by means of a suitably arranged planetary gearing 53, so that said rear rim 14' and said front rim 16' may revolve and operate at different speeds and in different directions.

The front unit —D— consisting of said piston and plunger combined cylinder block unit —C—, operates in unison with said rim 16' which is an integral part of said front web plate 16, said rim extends frontwardly from said web plate 16, see FIG. 1, said rim 16' having a rim boss section 54 provided with a plurality of equally spaced boss sections 56 and each boss section extending transversely through the width of said rim 16'.

A suitable cross space 56' is provided in each of said transversely positioned boss section 56, thus forming a pair of side-bosses, each of which having a socket 57 wherein a suitable resilient bushing 58 is mounted and adapted for accommodating therein a pivotal pin 60.

A connecting rod boss 62 is positioned within each of said cross space section 56', each boss 62 having a pivotal pin 60 mounted therein and extending endwardly therefrom, and each extended end of said pin 60 is mounted in said resilient bushings 58 disposed in said respective sockets 57, said connecting rod boss 62 having a connecting rod extension 64 and the end of which terminates with a spherically shaped piston member 66, having a piston ring 68 mounted thereon, as shown in FIGS. 5 and 6.

Each piston member 66 and the respective piston ring 68 being closely fitted within the walls of the cylinder chamber 70, thus preventing a sideward slippage of the fluidic mass, when the apparatus is in operation.

Said spheroidal piston member 66 is made preferably in two sections, the upper half section 71 having an internally threaded bushing and forming an integral part of said connecting rod extension 64, while the detachable lower half piston section 72 is secured and held in place by means of an outwardly threaded section or collar 74 for engaging said threaded bushing and in combination, providing an annular recess 76 which is adapted for holding said piston ring 68 in place and position, as shown in FIGS. 5 and 6.

Said lower half piston section 72 is provided with an internal cavity 78 having a semi-spherical bottom, as shown in FIG. 5, and also having a suitable slot 80 adapted for inter-connecting said cavity 78.

A neck member 82 of the plunger member 84 is placed through said slot 80 extending into said cavity 78, having the inwardly extending neck end section 85 threaded and secured by a suitably threaded retainer member 86 which is adapted for holding said plunger member 84 in position, said retainer member 86 having a semi-spherical bottom section for allowing said plunger member 84 to move and slide angularly and sidewardly along said slot 80, as shown in FIGS. 2 and 5.

Said cylinder block unit —C— comprises a front cylinder chamber unit 88 wherein a plurality of said cylinder chambers 70 are radially positioned, as shown in FIG. 2, each of said cylinder chambers 70 being provided with an inter-connecting plunger chamber 90 and adapted to receive and for slidably holding said piston member 66 including said plunger member 84 therein.

Each of said plunger chambers 90 terminate at the centrally positioned cylinder bar member 92, see FIGS. 1, 2, 5 and 6, said cylinder bar member 92 being held in an adjustably off-center position, for providing a variable reciprocal action of said plunger and piston members 84 and 66 respectively.

It may be noted, that when said piston member 66 is moved into an upward position, which is to the outer peripheral edge of said cylinder chamber 70, then said plunger member 84 will follow an upward path, because the position of said plunger is maintained by said retainer member 86 co-acting in said cavity 78, and which also allows considerable amount of freedom in the sideward direction and rotary motion along longitudinal axis of said plunger when in a slidably reciprocal action.

In order to hold said combined rim members 14' and 16' in proper position and in relation to said respective rear cylinder unit 32 of said block unit —B— including said front cylinder chamber unit 88 of said cylinder block unit —C—, and for preventing a counter-rotation of said rear and front cylinder units 32 and 88, respectively, and also for holding same in proper position with respect to said combined balancing member —E— of the apparatus, a plurality of suitable stabilizing means 94 are provided, as shown in FIGS. 1, 2 and 3.

Each of said stabilizing means 94 comprise a resilient or flexible longitudinal member 96, having one end thereof extending into a suitable socket 98 which is positioned at suitably spaced intervals and radius within said adjacent web sections 14 and 16 of said combined balancing member —E—, while the other and outwardly extending end of said stibilizing member 96 extends into a suitable and oppositely positioned socket 100 disposed in said cylinder chamber units 32 and 88 respectively, said sockets 100 being suitably spaced at intervals and radius corresponding in positions and locations identically to the positions of said sockets 98, and each socket 98 and 100 having a countersunk opening edge for clearance, as shown in FIG. 1.

Said cylinder chambers 70 are each provided with an intake and discharge check valves 102 and 104 respectively, each check valve having connecting passages 106 and 108 which extend to and terminate at said cylinder bar member 92.

In juxtaposition to each of said intake and discharge passages 106 and 108, said cylinder center bar member 92 is provided with suitably positioned grooves 110 and 112, each groove having a communicating and longitudinal passage 114 and 116 respectively, which extends to the outwardly positioned end of said cylinder bar member 92 and connecting to the exteriorly disposed outlet and discharge pipe connections 118 and 120, and adapted for connecting thereto the respective pipe tube mountings 122. (One shown in FIG. 4.)

Also, in juxtaposition to said plunger chambers 90, said cylinder bar member 92 is provided with fluid passages 124 and 126, as shown in FIGS. 1, 2 and 5, each of said passages is provided with a longitudinally extending passage 128 and 130 respectively, said passages 128 and 130 being adapted for connecting the respective side boss pipe connections 132 and 134, see FIGS. 1 and 4, and which are disposed in a mounting block member 136 and secured to said outwardly extending end of said cylinder bar member 92, said boss pipe connections 132 and 134 being adapted for attaching thereto suitable tubular extensions 138 and 140, each of which connecting the respective pipe mounting boss members 142 and 143.

Said cylinder bar member 92 is also provided with a suitable spacing collar 144 adapted for maintaining said front cylinder unit 88 in position and against the endwardly positioned bar plate member 146, also, said cylinder bar member 92 is suitably secured in said mounting block member 136, which is held at the outer surface of said front cover 4 in an upwardly and downwardly slidable position, supported in place by a pair of side plates 148 and 150, said plates being secured in position by means of a plurality of bolts 152, as shown in FIGS. 1 and 4.

Said front cover 4 is also provided with a longitudinal slot 154 for allowing said cylinder bar member 92 to pass therethrough, while said mounting block member 136 is provided with a supporting plate 156 which is slidably mounted within a suitable flat bottom groove or way 158, also, said block member 136 having an endwardly extending gear rack member 160 which is mounted in groove 162 and between a pair of bearing lugs 164, said gear rack member 160 is in mesh with a pinion 166 having a pinion shaft 168 which is mounted in said bearing lugs 164, also, said pinion shaft 168 is provided with a suitable lever 170 for controlling the position of said gear rack member 160, thereby allowing said mounting block member 136 together with said cylinder bar member 92 to slide upwardly and downwardly, for increasing or decreasing the off-center position of said cylinder chamber unit 88 and thereby controlling the stroke of each piston and plunger member 66 and 84 respectively, and when the apparatus is in use and operation.

Therefore, when a suitable driving motor (not shown) is provided for said shaft 12, then said rear cylinder chamber unit 32 of said block unit —B— may be used for securing a circulation of the fluid or air, and the front cylinder chamber unit 88 of said cylinder block unit —C— may be used for securing a vacuum, air pressures and fluid circulation, all three features operating simultaneously and each feature performing the operation independently of the other.

Also, when the volume of air or fluid under pressure is forced into the cylinder chambers 34 of said rear cylinder chamber unit 32 of said block unit —B— then, a suitable motive unit such as a generator, driving pulley apparatus, or the like, may be attached to or mounted on said shaft 12, and the front cylinder chamber unit 88 of said cylinder block unit —C— may be used for the purposes hereinbefore described.

It may further be noted, that various methods of lubrication may be used for providing the lubricant to said cylinder chambers 34 and 70 including said plunger chambers 90, however, the lubrication of said pivotal pins 46 and 60 need not be required, because the resilient action of the respective pivot bushings 48 and 58 will provide sufficient tangential torque or twisting motion for said piston extensions 42 and said connecting rod extensions 64, thereby allowing said apparatus to revolve uniformly during the operation thereof, and due to the particular structure of the pivot bushing elements herein described the lubrication of the respective parts may be entirely eliminated.

It may also be noted, that said plunger member 84 which is held in place by means of said plunger neck member 82 and supported in position by means of said retainer member 86, will have a rotating motion along the longitudinal axis thereof and during the reciprocal action of said plunger, which will prevent a sideward wearing of the walls of the plunger chamber 90.

Also, that said plunger member 84 may, if so desired, be made substantially an integral part of said lower half piston section 72 of said spherically shaped piston member 66, said lower half piston section 72 having the same structural characteristics for holding said piston ring 68 in position as shown, and that the upper half section 71 of said piston member 66 may be made a separate member from said connecting rod extension 64.

Said upper half section 71 of said piston member 66 may then be pivotally mounted to said connecting rod extension 64 and be held in place by means of a suitable pin or the like, and thereby holding and maintaining said piston member 66 including said plunger member 84 in position, when the apparatus is in use and operation.

While I have thus described my invention with great particularity, it will be clear that the same may be modified throughout a wide range.

Accordingly, I do not propose to be limited to the exact details of construction herein shown on the drawings and described in the specification, but reserve the rights in practice to make the necessary changes and modifications therein, which may come within the scope of the appended claims.

I claim as my invention:

1. In a combined hydraulic and pneumatic apparatus of the class described for pumping a liquid and a gas in variable volumes, simultaneously and independently of each other, comprising a housing having a front and a rear open end, a front and a rear cover mounted the respective open ends of said housing, a bearing boss at the inner side of said rear cover disposed in an off-center position and extending into said housing;

(a) a rear hydraulic unit means mounted on said bearing boss in an off-center position and in a close proximity to the inner side of said rear cover, said hydraulic unit means having a cylinder block chamber unit provided with a plurality of cylinder chambers radially positioned therein and a plurality of piston means reciprocally positioned in said cylinder chambers, and each piston means having a piston rod extending outwardly from each of said cylinder chambers;

(b) a front hydraulic and pneumatic unit means positioned at the inner side of said front cover, said hydraulic and pneumatic unit means having a plurality of cylinder and plunger combination chambers radially positioned therein, each cylinder and plunger combination chamber having a combined piston and plunger means reciprocally positioned therein, and each piston having a connecting rod extending outwardly from each radially positioned cylinder chamber of said hydraulic and pneumatic unit means;

(c) a balancing means in said housing having a centrally and transversely positioned web plate, a rim at the periphery of said web plate extending frontwardly and rearwardly therein for securing the front and the rear rim sections, a plurality of resilient bushing means in each of said frontwardly and rearwardly extending front and rear rim sections for connecting the respective connecting rods of said pistons of said front hydraulic and pneumatic unit means and said piston rods of said rear hydraulic unit means;

(d) a cylinder center bar means adjustably and movably mounted on said front cover and extending into said frontwardly extending rim section of said balancing means for supporting said front hydraulic and pneumatic unit means when moved and adjusted from its normally center position and into an extreme off-center rotatable position;

(e) a fluid passage means in said rear cover for connecting said rear hydraulic unit means thereby securing fluid flow through said rear hydraulic unit means when rotating together with said balancing means, a plurality of fluid passage means in said adjustably and movably mounted cylinder center bar means for connecting said front hydraulic and pneumatic unit means, for securing the fluid flow through said rear hydraulic unit means and also for securing a liquid and a gas circulation through said front hydraulic and pneumatic unit means simultaneously and separately from each other and independently with respect to the fluid flow passing through said rear hydraulic unit means, and when said balancing means is rotating;

(f) and a shaft in said web plate of said balancing means extending endwardly and rearwardly therefrom and revolvably mounted in said bearing boss of said rear cover of said housing, for supporting said rotatable position of said balancing means when said apparatus is in rotation.

2. In the apparatus of the class described as defined in claim 1, wherein, said fluid inlet and outlet passage means in said rear cover of said housing are directed to said off-center boss internally positioned therein for connecting the cylinder chambers of said rear hydraulic unit means; and, wherein said plurality of fluid passage means of said combined fluid inlet and outlet passages including said air inlet and outlet passages in said adjustably and movably mounted cylinder center bar means are connecting said piston and plunger chambers of said front hydraulic and pneumatic unit means, and each terminating outwardly of said front cover of said housing for maintaining the flow of fluid and air circulation simultaneously, separately and independently of each other and also at variable volumes thereof and when the apparatus is in use and operation.

3. In the apparatus of the class described as defined in claim 1, wherein a plurality of stabilizing means are provided in said rear hydraulic unit means and said front hydraulic and pneumatic unit means and each connecting said centrally positioned pair of web plates of said balancing means for maintaining a relative rotating position therebetween and during the operation of said apparatus.

4. In the apparatus of the class described as defined in claim 1, wherein each of said piston means in said rear hydraulic unit means comprise a spheroidal member which consists of an upper and a lower half sections, means for holding said upper and lower half sections together, and a piston ring means between said upper and lower half sections for securing close fit in each cylinder chamber and for securing fluid circulation therein.

5. In the apparatus of the class described as defined in claim 1, wherein each of said combined piston and plunger means consists of a spheroidal piston member and a tiltable plunger member, said spheroidal piston member consisting of an upper and a lower half sections, means for holding said upper and lower half sections together, an internal cavity in said lower half section, a piston ring means between said upper and lower half sections for securing close fit in each cylinder chamber, a slot in said lower half section, a cylindrical plunger tiltably mounted in said slot, and a retainer means within said internal cavity of said lower half section for holding said cylindrical plunger in said slot and in tiltable position and for allowing an axially rotating motion along the longitudinal axis thereof during the reciprocal movement of said plunger means.

6. In the apparatus of the class described the combination with, a housing having a rear and a front cover, an off-center bearing boss in said rear cover extending endwardly into said housing, a combined balancing means revolvably positioned within said housing and between said front and rear cover, said balancing means having a circumferential periphery and a centrally positioned web plate, a shaft extending endwardly from said web plate of said balancing means and mounted in said rear cover for holding said balancing means in rotatable position within said housing, a rim at the periphery of said balancing means extending rearwardly and frontwardly from said web plate having the ends of said rim terminating in close proximity to said rear and said front cover of said housing, a rear pumping unit means in said housing revolvably mounted upon said off-center bearing boss of said rear cover and positioned within said rearwardly extended rim of said balancing means, a front pumping unit means in said housing positioned at the inner side of said front cover and disposed within said frontwardly extending rim of said balancing means, a plurality of cylinder chambers radially positioned in said rear pumping unit means, a piston in each cylinder chamber, a connecting rod extending from each piston and each connecting rod being pivotally connected to said rearwardly extended rim of said balancing means for securing reciprocal action in said cylinder chambers, a plurality of combined cylinder and plunger chambers radially positioned in said front pumping unit means, each combined cylinder and plunger chamber having a combined piston and plunger means, and each piston means having a connecting rod extending therefrom and pivotally connecting said frontwardly extending rim of said balancing means for securing reciprocal action therein and when said balancing means is in rotation, an adjustably movable cylinder center bar means mounted in said front cover of said housing for holding said front pumping unit means in rotatable position, fluid passages in said cylinder center bar means extending longitudinally therein and connecting said combined cylinder and plunger chambers of said front pumping unit means, fluid inlet and outlet passages in said rear cover and connecting said off-center bearing boss for connecting said cylinder chambers of said rear pumping unit means, and variably adjustable means in said front cover for holding said cylinder center bar means including said front pumping unit means in an adjustable position and thereby providing a variable fluid flow for said front pumping unit means and an independent fluid flow for said rear pumping unit means when said shaft and said balancing means are rotated and said apparatus is in operation.

7. In a combined hydraulic pump and motor of the class described, comprising in combination, a housing having a front and a rear cover, said rear cover having an off-center bearing boss at the inner side thereof and extending into said housing, a rear hydraulic unit means in said housing in close proximity to said inner side of said rear cover and revolvably mounted upon said off-center bearing boss, a front hydraulic and pneumatic unit means in said housing and disposed in close proximity to the inner side of said front cover, a plurality of piston means radially positioned in said rear pumping unit means, a connecting rod extending outwardly from each piston means, a plurality of combined piston and plunger means radially positioned in said front pumping unit means, each piston means having a connecting rod extending outwardly therefrom, a balancing means disposed in said housing and having a centrally positioned web plate provided with a circumferential peripheral rim extending frontwardly and rearwardly from said web plate, said rearwardly extending rim connecting said radially extending connecting rods of said piston means of said rear hydraulic unit means for pumping fluid therethrough, and said frontwardly extending rim connecting said radially extending connecting rods of said combined piston and plunger means of said front hydraulic and pneumatic unit means for separately pumping a liquid and a gas, a shaft in the center of said web plate of said balancing means extending rearwardly therefrom and revolvably mounted in the center of said rear cover of said housing, a variably adjustable and movable cylinder center bar means mounted in said front cover of said housing for supporting said front hydraulic and pneumatic unit means in revolvable position, adjustable means in said front cover for holding said cylinder center bar means including said front hydraulic and pneumatic unit means in a variably adjustable position, an inlet and outlet passages in said rear cover connecting said off-center bearing boss of said rear hydraulic unit means for directing the passage of fluid therethrough, and fluid inlet and outlet passages longitudinally positioned in said cylinder center bar means each connecting said piston and plunger chamber combinations of said front hydraulic and pneumatic unit means for directing, pumping and circulating said liquid and gas simultaneously and independently of each other when passing through said front hydraulic and pneumatic unit means and for pumping fluid simultaneously and independently when passing through said rear hydraulic unit means with respect to the operation of said front hydraulic and pneumatic unit means during the rotation of said apparatus.

8. In the apparatus of the class described as disclosed in claim 7, wherein each of said piston means is closely fitted into cylinder chambers of said rear hydraulic unit means, a spheroidal upper half and spheroidal lower half sections in each piston means, a piston ring between said upper and lower half sections for maintaining fluid circulation in said rear hydraulic unit means, and each of said combined piston and plunger means consists of a spheroidal piston and a tiltable cylindrical plunger, said spheroidal piston having an upper and lower half sections closely fitted into cylinder chambers of said hydraulic and pneumatic unit means, a piston ring between said upper and lower half sections for maintaining fluid circulation in said front hydraulic and pneumatic unit means, a slot in said lower half section, and a retainer means in said lower half section for holding said cylindrical plunger means in said slot and in a tiltable position and for allowing a rotating motion along the longitudinal axis thereof during the reciprocal action of said combined piston and plunger means when said apparatus is in rotation.

9. In a combined hydraulic and pneumatic apparatus of the class described comprising in combination, a tubular housing having open ends, a front and a rear cover enclosing said open ends, an off-center bearing boss in said rear cover extending inwardly into said housing, a combined balancing means in said housing centrally positioned therein and having a rim at the circumferential periphery thereof, a combined web plate centrally positioned in said balancing means for dividing said rim into a frontward and a rearward rim section, a shaft extending from said rearwardly positioned web plate of said balancing means and passing through said rear cover of said housing and revolvably mounted therein for holding said balancing means in rotatable position, said off-center bearing boss extended toward and terminating in close proximity to said rearwardly positioned web plate, inlet and outlet groove means in said off-center bearing boss, inlet and outlet passages connecting said groove means extending through and terminating at the outer section of said rear cover; a rear cylinder chamber unit means revolvably mounted on said off-center bearing boss and disposed within said rearwardly extending rim section of said balancing means, a plurality of cylinder chambers radially positioned in said rear cylinder chamber unit means, a piston in each cylinder chamber, an extension rod in each piston terminating with a pivoting boss, a pivot pin in each of said pivoting boss of said extension rod for connecting said rearwardly extending rim section of said balancing means, a resilient bushing means in said rearwardly extending rim section for holding each of said pivot pins in pivotal position therein, said resilient bushing means being spaced in an equidistant position in said rearwardly extending rim section and in equal number corresponding to said pistons in said cylinder chambers of said rear cylinder chamber unit means, the combination of, a combined hydraulic and pneumatic cylinder chamber unit means disposed within said frontwardly extending rim section of said balancing means for simultaneously pumping a liquid and a gas, and consisting of, a plurality of combined piston and plunger chambers radially positioned in said combined hydraulic and pneumatic unit means, means in said combined hydraulic and pneumatic unit means for independently controlling the fluid passage therein, a combined piston and plunger means in each of said combined piston and plunger chambers, a connecting rod extending from each piston and terminating with a connecting rod boss, a pivot pin in each connecting rod boss for mounting same in said frontwardly extending rim section of said balancing means, a resilient bushing means in said frontwardly extending rim section for holding said pivot pin of each connecting rod boss in pivotal position in said balancing means, said resilient bushing means being spaced in an equidistant position in said frontwardly extending rim section and in equal number corresponding to said combined piston and plunger means and the respective connecting rods thereof, a cylinder bar means extending into said housing and terminating in close proximity to said frontwardly positioned web plate of said balancing means and movably mounted upon the front surface of said front cover for holding said combined hydraulic and pneumatic cylinder chamber unit means in said housing in a rotatable and in an off-center adjustably movable position, a variably adjustable and movable means connecting said cylinder bar means for holding said combined hydraulic and pneumatic cylinder chamber unit means in a variably adjustable position in relation to the central position of said balancing means, a plurality of passages in said cylinder bar means for connecting each of said combined piston and plunger chambers of said combined hydraulic and pneumatic cylinder chamber unit means for directing the fluid flow therethrough simultaneously, independently and separately from each other and also independently from the fluid flow passing through said rear cylinder chamber unit means, and stabilizing means connecting said combined web plate of said balancing means and said rear cylinder chamber unit means including said combined hydraulic and pneumatic cylinder chamber unit means for maintaining a relative stabilized position therebetween and when said combined balancing means is rotating and the apparatus is in use and operation.

10. In a combined hydraulic and pneumatic apparatus of the class described, as defined in claim 9, wherein a set of planetary gearing means are provided between said combined web plates centrally positioned in said balancing means for securing a rotating motion of said rear cylinder chamber unit means in one direction and the combined hydraulic and pneumatic cylinder chamber unit means in an opposite direction and at relatively different speeds, when said apparatus is in use and operation.

References Cited in the file of this patent
UNITED STATES PATENTS

| | | |
|---|---|---|
| 2,227,631 | Carter | Jan. 7, 1941 |
| 2,939,403 | Von Soden | June 7, 1960 |
| 2,967,490 | Von Soden | Jan. 10, 1961 |